United States Patent
Chang et al.

(10) Patent No.: US 11,465,251 B2
(45) Date of Patent: Oct. 11, 2022

(54) BUILT-IN TYPE ELECTRIC DRIVING SYSTEM OF MACHINE TOOL AND OPERATION METHOD THEREFOR

(71) Applicants: KHAN WORKHOLDING CO., LTD., Changwon-si (KR); DONG-A UNIVERSITY RESEARCH FOUNDATION FOR INDUSTRY-ACADEMY COOPERATION, Busan (KR)

(72) Inventors: Junghwan Chang, Busan (KR); Yongseon Yun, Changwon-si (KR); Bonsaeng Ku, Changwon-si (KR)

(73) Assignees: KHAN WORKHOLDING CO., LTD., Changwon-si (KR); DONG-A UNIVERSITY RESEARCH FOUNDATION FOR INDUSTRY-ACADEMY COOPERATION, Busan (KR)

( * ) Notice: Subject to any disclaimer, the term of this patent is extended or adjusted under 35 U.S.C. 154(b) by 273 days.

(21) Appl. No.: 16/964,771

(22) PCT Filed: Jan. 23, 2019

(86) PCT No.: PCT/KR2019/000973
§ 371 (c)(1),
(2) Date: Jul. 24, 2020

(87) PCT Pub. No.: WO2019/151708
PCT Pub. Date: Aug. 8, 2019

(65) Prior Publication Data
US 2021/0053168 A1 Feb. 25, 2021

(30) Foreign Application Priority Data
Feb. 1, 2018 (KR) .......................... 10-2018-0013109

(51) Int. Cl.
*B23Q 5/10* (2006.01)
*B23Q 5/56* (2006.01)
*B23B 31/107* (2006.01)

(52) U.S. Cl.
CPC ............ *B23Q 5/10* (2013.01); *B23B 31/1072* (2013.01); *B23Q 5/56* (2013.01);
(Continued)

(58) Field of Classification Search
CPC .. B23Q 5/56; B23Q 27/02; B23B 2260/0625; B23B 2260/062; B23B 2260/00; B23B 2260/044
(Continued)

(56) References Cited

U.S. PATENT DOCUMENTS 9,071,120 B2 * 6/2015 Takahashi ............... H02K 33/16
2018/0021907 A1 * 1/2018 Suzuki ..................... B23Q 5/10
173/217

(Continued)

FOREIGN PATENT DOCUMENTS

| JP | H07-024695 A | 1/1995 |
| JP | 2001-009607 A | 1/2001 |

(Continued)

OTHER PUBLICATIONS

International Search Report for PCT/KR2019/000973 dated May 9, 2019 from Korean Intellectual Property Office.

*Primary Examiner* — Robert F Long
*Assistant Examiner* — Xavier A Madison
(74) *Attorney, Agent, or Firm* — Paratus Law Group, PLLC (57) ABSTRACT

Disclosed is a built-in type electric driving system of a machine tool. The system is capable of directly connecting a motor, which drives a spindle in a lathe which processes a workpiece, to an outer surface of the spindle without using (Continued)

a belt to rotate the spindle, and is capable of selectively transferring the power of the motor to a rotation system including a drawbar and a spindle for driving a chuck using a clutch device.

13 Claims, 11 Drawing Sheets

(52) U.S. Cl.
  CPC . *B23B 2260/044* (2013.01); *B23B 2260/0625* (2013.01); *B23Q 2705/02* (2013.01)
(58) Field of Classification Search
  USPC ........................................................ 173/217
  See application file for complete search history.

(56) References Cited

U.S. PATENT DOCUMENTS

2019/0375023 A1* 12/2019 Cusumano ........ B23B 29/03478
2021/0323107 A1* 10/2021 Yun ................... B23B 31/16266

FOREIGN PATENT DOCUMENTS

| JP | 2003-340617 A | 12/2003 |
| KR | 10-2016-0072569 A | 6/2016 |
| KR | 10-2017-0121605 A | 11/2017 |

\* cited by examiner

BUILT-IN TYPE ELECTRIC DRIVING SYSTEM OF MACHINE TOOL AND OPERATION METHOD THEREFOR

CROSS-REFERENCE TO PRIOR APPLICATIONS

This application is a National Stage Patent Application of PCT International Patent Application No. PCT/KR2019/000973 (filed on Jan. 23, 2019) under 35 U.S.C. § 371, which claims priority to Korean Patent Application No. 10-2018-0013109 (filed on Feb. 1, 2018), which are all hereby incorporated by reference in their entirety.

BACKGROUND

The present invention relates to a machine tool, and more specifically, to a built-in type electric driving system of a machine tool capable of directly connecting a motor, which drives a spindle in a lathe which processes a workpiece, to an outer surface of the spindle without using a belt to rotate the spindle, and capable of selectively transferring the power of the motor to a rotation system including a drawbar and a spindle for driving a chuck using a clutch device, and an operation method thereof.

Generally, a machine tool consists of a workpiece and a processing tool, and when one of the above is fixed, the other rotates to process a shape of the workpiece, and the machine tool can be divided into a lathe and a milling machine according to a rotating part.

The lathe is configured in a way in which the workpiece rotates in a state in which the processing tool is stopped, and commonly, the lathe consists of a chuck which fixes the workpiece, a drawbar which drives the chuck, and a spindle which rotates the drawbar, the chuck, and the workpiece.

A conventional lathe requires independent driving systems to drive a drawbar and a spindle, and mainly, a hydraulic system has been applied to the drawbar and an electrical system has been applied to the spindle. In the case of the conventional hydraulic driving system, since a hydraulic pressure is used as a power source for a chuck which grips a workpiece and the spindle which rotates the workpiece, a response speed is slow and a clamping force of the chuck is difficult to be precisely controlled. Accordingly, it is impossible to actively control a gripping force of the chuck according to a material of the workpiece and a cutting condition. Further, in most cases, since a method of transmitting the power of a motor to the spindle through a belt is used, efficiency is degraded due to friction between the belt and a pulley and slips of the belt, and problems of noise, vibration, and maintenance are difficult to be solved.

In order to overcome problems of the belt-driven hydraulic driving system, although several advanced companies such as Rohm, Hainbuch, and Forkardt of Germany recently released commercial products for the electric-driven spindle system, a belt-driven method is still adopted. Further, although a company such as Mitsubishi Electric in Japan is adopting built-in spindles, since a hydraulic pressure is used as a power source for gripping a workpiece, requirements of new industries cannot be actively managed.

SUMMARY

The present invention is directed to providing a built-in type electric driving system of a machine tool capable of directly connecting a motor, which drives a spindle, to an outer surface of the spindle without using a belt to rotate the spindle, and capable of selectively transferring power of the motor to a rotation system including a drawbar and a spindle for driving a chuck using a clutch device, and an operation method thereof.

One aspect of the present invention provides a built-in type electric driving system of a machine tool including: a housing; a hollow tube-shaped spindle extending from the housing in forward and backward directions and rotatably installed on the basis of the housing; a built-in motor consisting of a stator fixed to the inside of the housing and a rotor fixed to an outer surface of the spindle, and configured to generate torque between the stator and the rotor by power applied from the outside to cause rotation of the rotor; a chuck installed at a front end of the spindle and including a jaw configured to grip a workpiece; a drawbar installed at an inner side of the spindle to be linearly movable in the forward and backward directions, and having a front end connected to the jaw; a drawbar key and a drawbar key groove configured to connect the drawbar to the chuck so that the drawbar is linearly movable, but not rotatable; a chuck locking unit configured to restrict or release the rotational movement of the chuck on the basis of the housing; a clutch unit installed to be movable in the forward and backward directions between a front portion of the spindle and a rear portion of the chuck to restrict the spindle relative to the chuck or separate the spindle so that the spindle is rotatable relative to the chuck; a lead screw formed with a thread in a spiral shape on an outer surface thereof, and formed to be fixed to the drawbar; a driving unit fixed to the outer surface of the spindle to rotate together with the spindle; and a female screw cover coupled to the driving unit to rotate together with the driving unit, and having a thread formed on an inner circumferential surface thereof to be screw-coupled to the thread of the lead screw.

A method of operating the above-described built-in type electric driving system according to the present invention are formed of the following operations.

(S1) operating a chuck locking unit to fix a chuck to a housing (S2) operating a clutch unit to separate a spindle from the chuck so that the spindle is rotatable relative to the chuck (S3) applying power to a built-in motor to rotate the spindle by a predetermined amount in one direction (S4) rotating a female screw cover through rotation of a driving unit coupled to the spindle to move a lead screw and a drawbar backward or forward by a predetermined distance, and clamp a workpiece (S5) operating the clutch unit in a manner opposite the operation (S2) to restrict the spindle to the chuck (S6) operating the chuck locking unit in a manner opposite the operation (S1) to release a fixed state of the chuck (S7) applying power to the built-in motor to process the workpiece while rotating the spindle at a predetermined rotational speed in the one direction According to one aspect of the operating method according to the present invention, rotating the spindle (20) and adjusting a position of a movable clutch (82) of the clutch unit so that the built-in motor operates in a direction opposite the direction in the operation (S3) by receiving a position signal from an encoder unit between the operations (S4) and (S5) and thus teeth of a first serration (81*a*) formed in a fixed clutch (81) of the clutch unit and a second serration (82*a*) formed in the movable clutch (82) are accurately engaged may be performed.

According to the present invention, a clamping operation and an unclamping operation of a workpiece due to a drawbar can be performed by transferring a rotational force of a spindle to a chuck or separating the spindle from the chuck by operations of a chuck locking unit and a clutch unit. Accordingly, since both a clamping driving mode and a spindle rotating mode can be performed by a built-in motor without using a belt, there are effects in that a problem according to use of the belt can be solved, and overall configurations and operations of the machine tool can be simplified.

BRIEF DESCRIPTION OF THE DRAWINGS

FIGS. 4A and 4B are cross-sectional views of an enlarged portion of the built-in type electric driving system shown in FIG. 1, wherein FIG. 4A shows a clamping driving mode, and FIG. 4B shows a spindle driving mode.

DETAILED DESCRIPTION

Embodiments disclosed in the specification and components shown in the drawings are preferred examples of the present invention, and various modifications which may replace the embodiments of the specification and the drawings may be present at the time of filing the application.

Hereinafter, a built-in type electric driving system of a machine tool and an operation method thereof will be specifically described according to embodiments which will be described below with reference to the accompanying drawings. In the drawings, the same reference numeral refers to the same component.

First, referring to FIGS. 1 to FIG. 5, a built-in type electric driving system according to one embodiment of the present invention includes a housing 10 installed to be fixed to a main body of the machine tool, a hollow tube-shaped spindle 20 rotatably installed on the housing 10, a built-in motor installed between the inside of the housing 10 and an outer surface of the spindle 20, a chuck 50 installed at a front end of the spindle 20 and including a jaw 51 which grips a workpiece, a drawbar 40 installed at an inner side of the spindle 20 to be linearly movable in forward and backward directions, and having a front end connected to the jaw 51, a drawbar key 43 and a drawbar key groove 42 which connect the drawbar 40 to the chuck 50 so that the drawbar 40 is linearly movable, but is not rotatably movable, a chuck locking unit which restricts or releases rotation of the chuck 50 on the basis of the housing 10, a clutch unit installed to be movable in the forward and backward directions between a front portion of the spindle 20 and a rear portion of the chuck 50 to restrict the spindle 20 relative to the chuck 50 or separate the spindle 20 to be rotatable relative to the chuck 50, a lead screw 41 formed in a spiral shape on an outer surface of the drawbar 40, a driving unit fixed to the outer surface of the spindle 20 to rotate with the spindle 20, a female screw cover 95 coupled to the driving unit to rotate with the driving unit and formed with a thread 95a screw-coupled to the lead screw 41 on an inner circumferential surface thereof, and an encoder unit which detects a rotating amount and a rotating position of the spindle 20.

Figure 1:
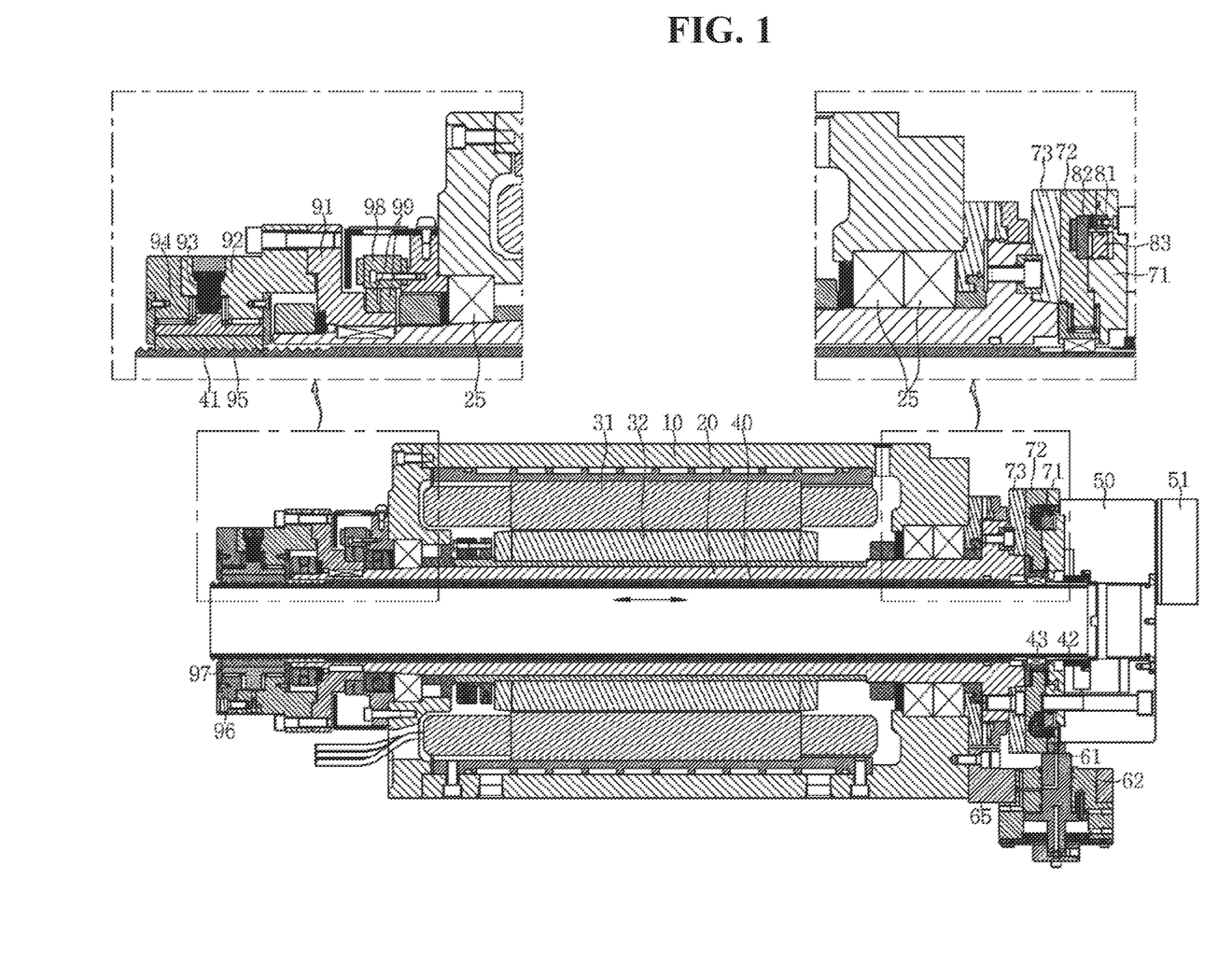
FIG. 1 is a cross-sectional view illustrating a built-in type electric driving system according to one embodiment of the present invention.
Figure 2:
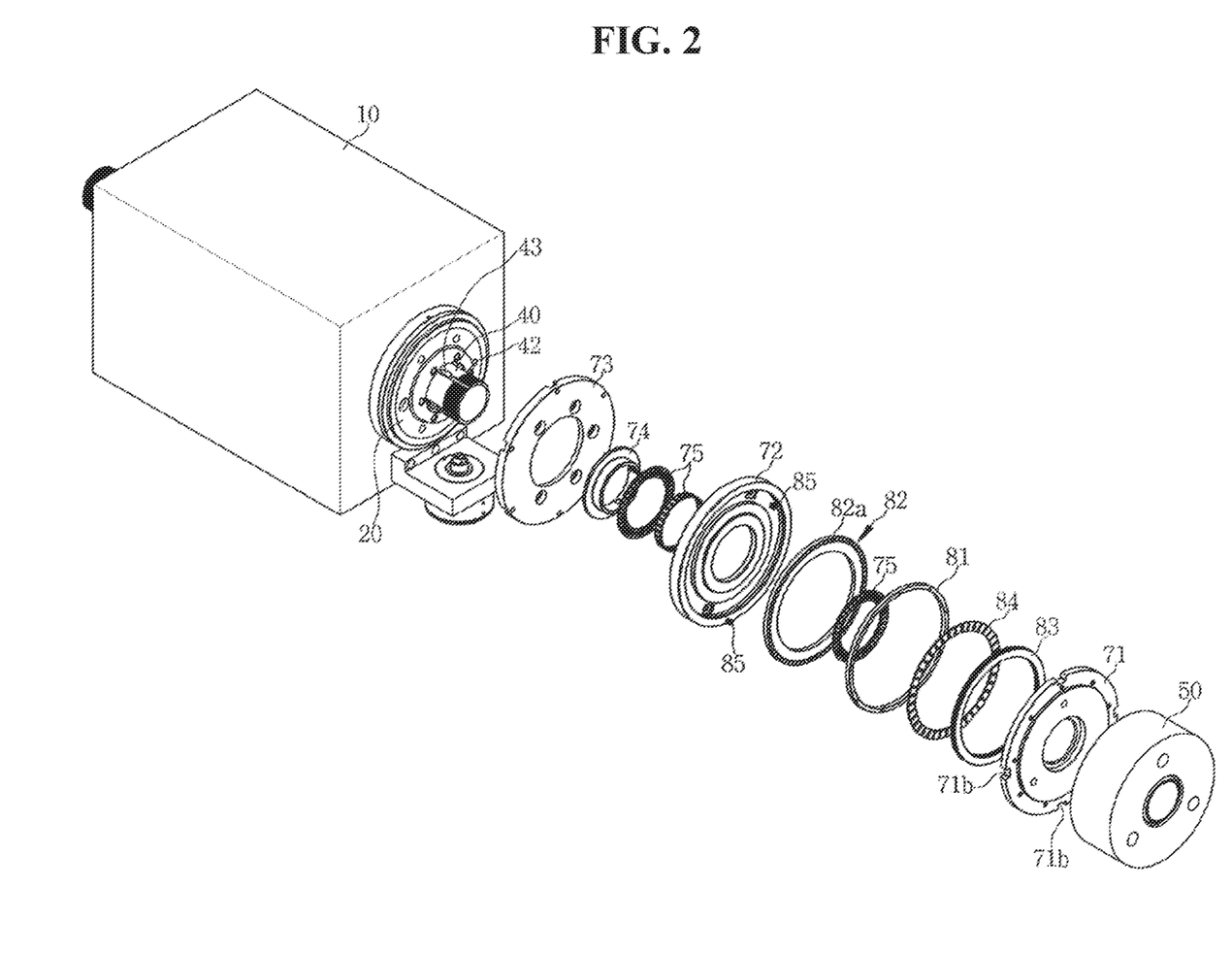
FIG. 2 is an exploded perspective view of components disassembled at the front of the built-in type electric driving system shown in FIG. 1.
Figure 3:
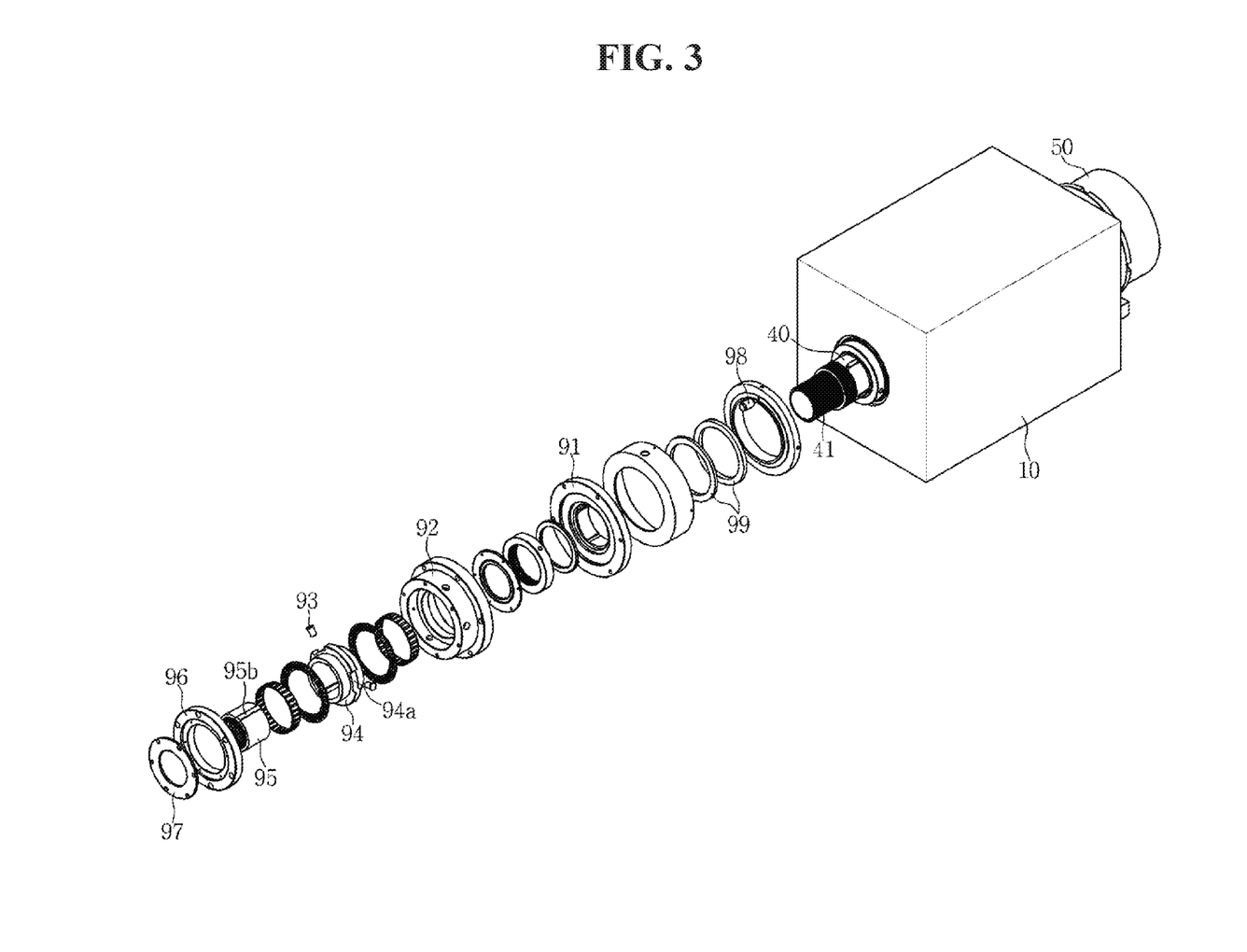
FIG. 3 is an exploded perspective view of components disassembled at the rear of the built-in type electric driving system shown in FIG. 1.

The housing 10 is formed in an empty cylindrical shape and installed to be fixed to the main body of the machine tool. The chuck 50 which processes the workpiece is provided at an outer side of a front portion of the housing 10, and the jaw 51 which grips the workpiece is installed on the chuck 50 to be movable in a radial direction. The jaw 51 is connected to a front end of the drawbar 40 through a link member (not shown) to grip or release the workpiece while moving in a radial direction by forward and backward linear movement of the drawbar 40. In the embodiment, although a case in which the jaw 51 clamps the workpiece by moving radially inward due to the backward movement of the drawbar 40 is described, on the other hand, the jaw 51 may be configured to clamp the workpiece by moving radially inward due to the forward movement of the drawbar 40 according to the structure of the chuck 50.

The spindle 20 is formed in the shape of a long cylindrical hollow tube, and is rotatably installed in an inner space of the housing 10 centered on a shaft extending in an axial direction (forward and backward directions). A plurality of spindle bearings 25 which rotatably support the spindle 20 on the basis of the housing 10 are installed between outer surfaces of a front portion and a rear portion of the spindle 20 and a front end and a rear end of the housing 10.

The drawbar 40 is installed to be linearly movable back and forth in the forward and backward directions, that is, in the axial direction of the spindle 20, in a hollow portion of the spindle 20, but not to be rotatable relative to the chuck 50. Since a plurality of drawbar key grooves 42 are formed to extend in the forward and backward directions on an outer circumferential surface of the front portion of the drawbar 40, and the drawbar keys 43 inserted into the drawbar key grooves 42 are fixed to an inner circumferential portion of the chuck 50, strictly speaking, a coupling bush 74 which is a component of the clutch unit fixed to the chuck 50, the drawbar 40 is restricted to be movable in the axial direction relative to chuck 50 and the spindle 20, but not to be rotatable relative to chuck 50.

The lead screw 41 for forward and backward operations of the drawbar 40 is formed on an outer surface of a rear end of the drawbar 40 in the shape of a thread wound spirally along the forward and backward directions. The lead screw 41 may be integrally formed with the drawbar 40, but alternatively, may be manufactured as an individual body with the drawbar 40 and then fixedly coupled to the rear end of the drawbar 40.

The built-in motor is installed in the housing 10 to generate a rotational force to rotate the spindle 20, and the built-in motor may consist of a stator 31 fixed to the inside of the housing 10 and a rotor 32 fixed to the outer surface of the spindle 20, like a known built-in motor for a machine tool. When power is applied to a coil wound around the core of the stator 31, torque is generated between the stator 31 and the rotor 32 to generate rotation of the rotor 32 and the spindle 20.

Referring to FIG. 2 and FIGS. 4A to FIG. 8, the clutch unit is configured to perform an action of restricting the spindle 20 relative to the chuck 50 or separating the spindle 20 to be rotatable relative to the chuck 50. In this embodiment, the clutch unit includes a fixing member 71 fixed to a rear surface of the chuck 50, a rotating member 72 fixed to the front end of the spindle 20 and rotatably connected to the fixing member 71, a fixed clutch 81 fixed to a rear of the fixing member 71 and formed with a serrated first serration 81a in a circumferential direction, a movable clutch 82 installed at a front of the rotating member 72 to be movable in forward and backward directions, and formed with a serrated second serration 82a formed in a circumferential direction which is engaged with the first serration 81a and restricts rotation of the rotating member 72 relative to the fixing member 71, and a clutch operating member which linearly moves the movable clutch 82 in forward and backward directions.

Figure 4A:
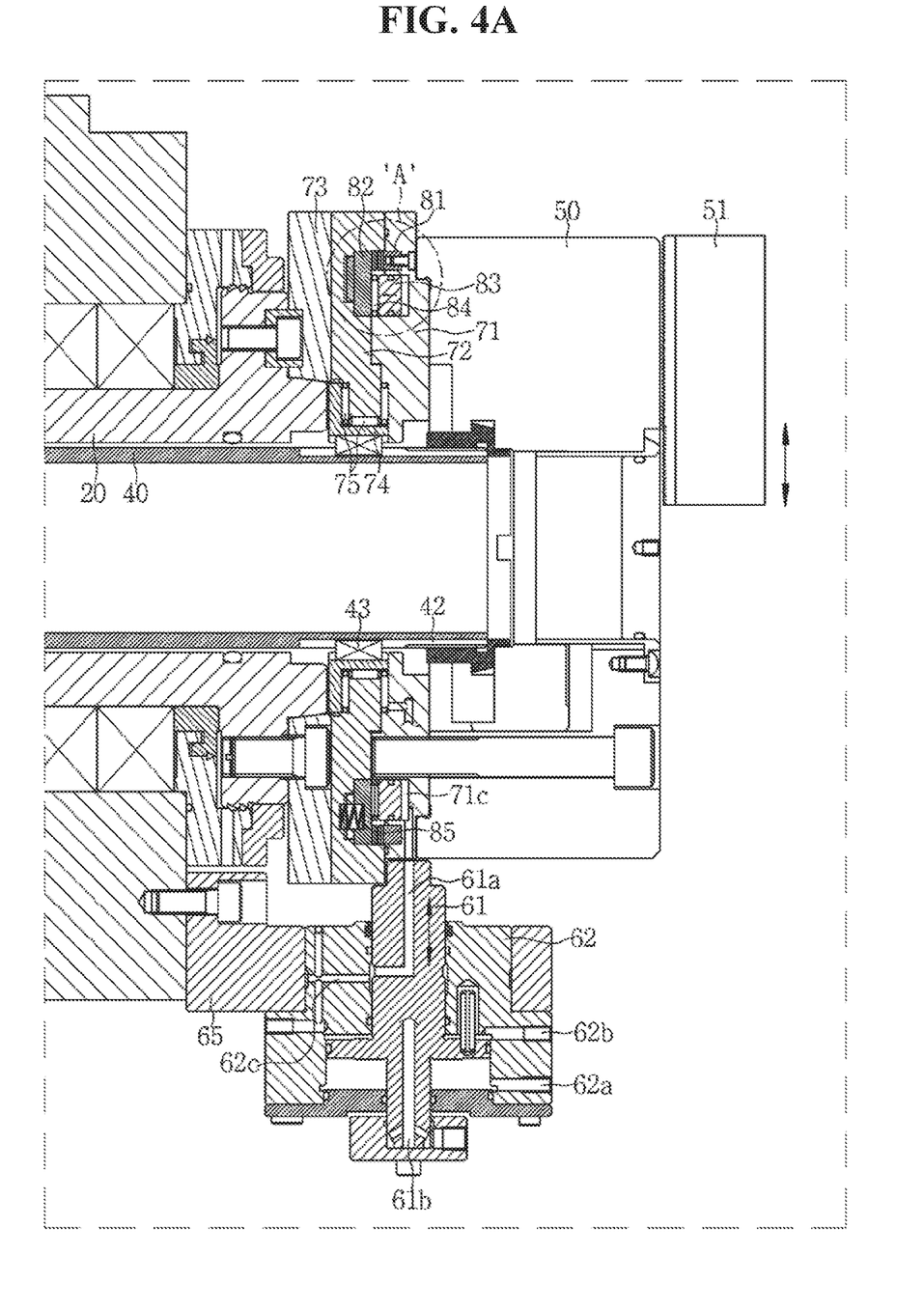
Figure 4B:
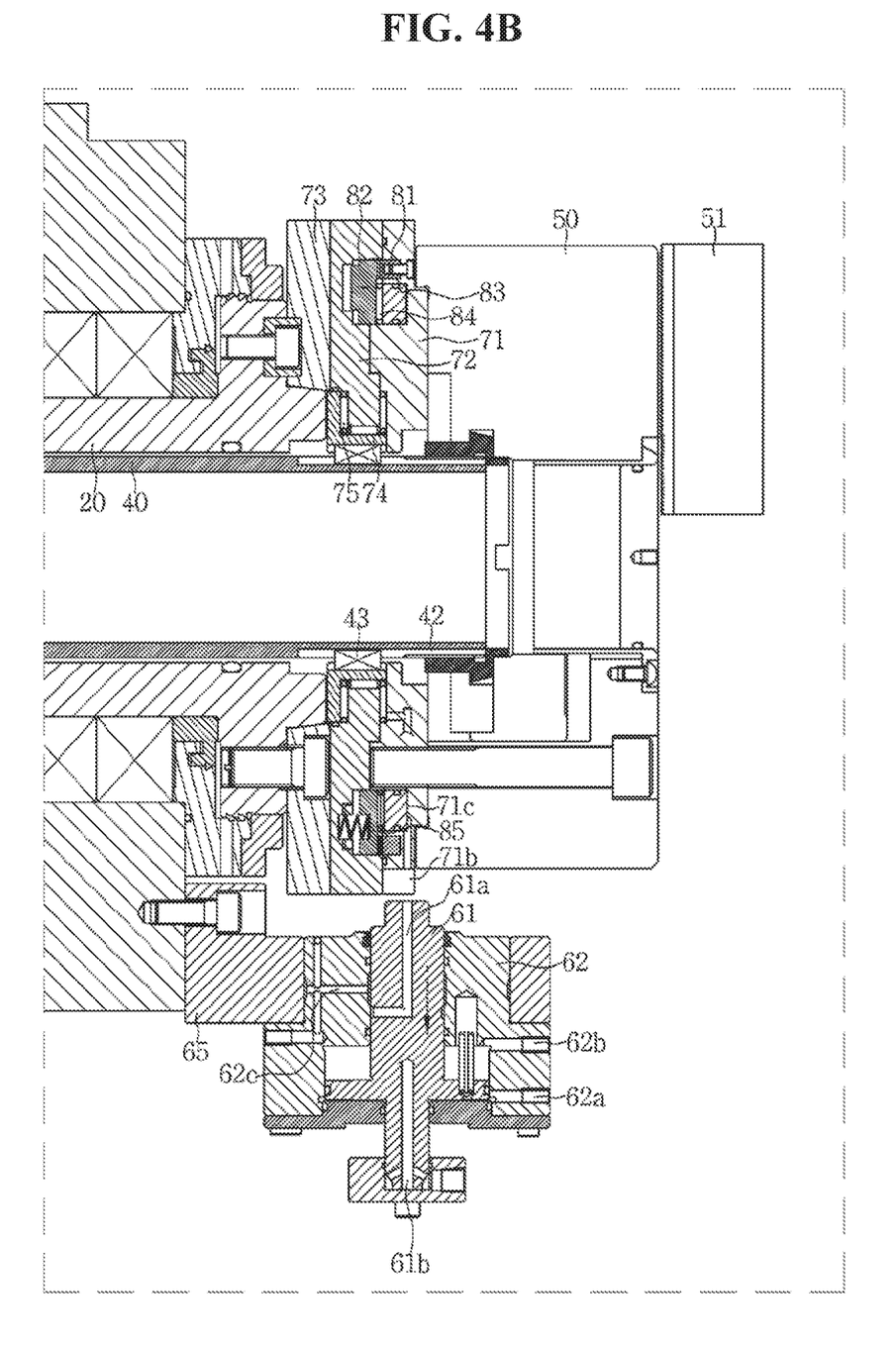
Figure 5:
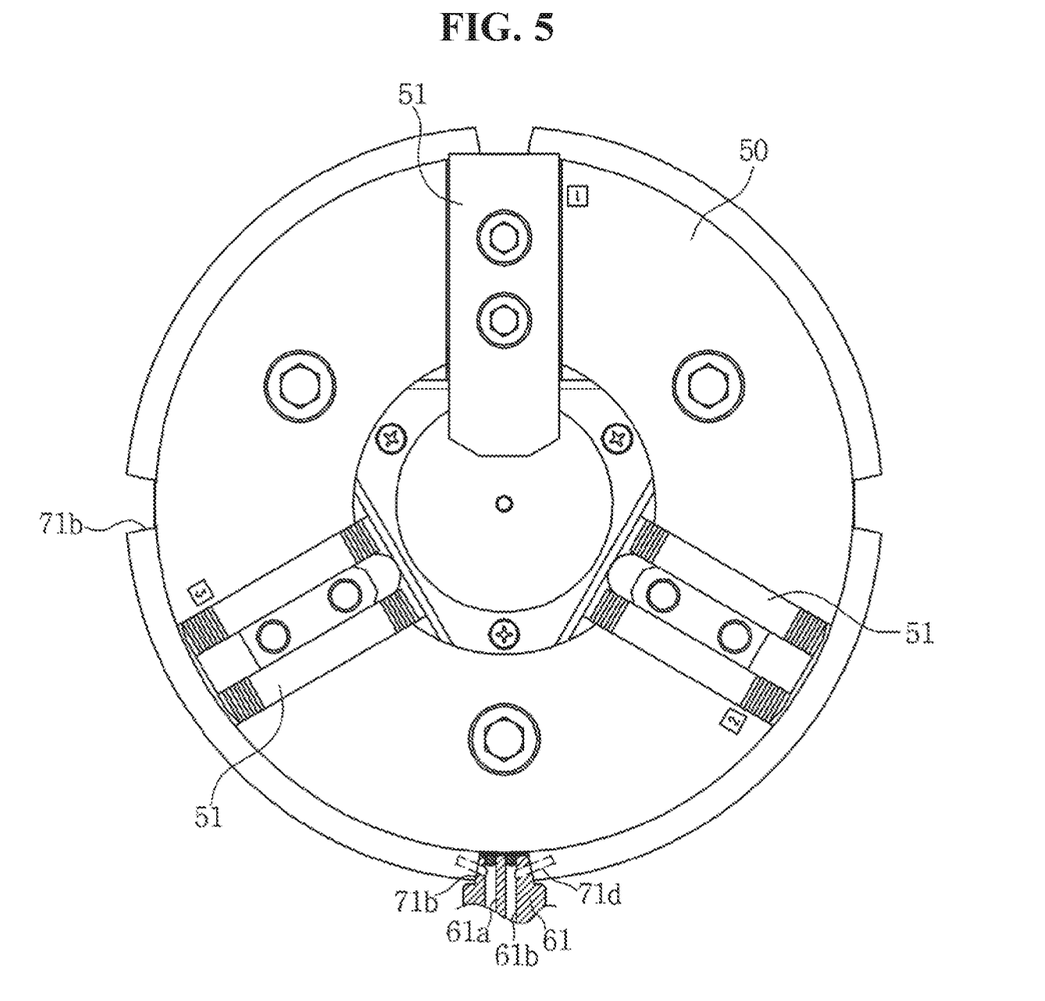
FIG. 5 is a front view of the portion shown in FIGS. 4A and 4B.

The fixing member 71 is installed to be fixed to a rear surface portion of the chuck 50 by a fastening means such as a bolt. The rotating member 72 is fixed to the front end of the spindle 20 at a rear of the fixing member 71, and a chuck adaptor 73 is fixed to the front end of the spindle 20 by a fastening means such as a bolt to couple the rotating member 72 to the spindle 20. The rotating member 72 is coupled to the chuck adaptor 73 by a fastening means such as a bolt. Further, a coupling bush 74 and bearings 75 are installed between the fixing member 71 and the rotating member 72, and thus the rotating member 72 is installed to be rotatable relative to the fixing member 71. The coupling bush 74 is formed to have a ring-shape having an L-shaped cross-section and then is fitted between an outer surface of the front end of the drawbar 40 and an inner circumferential surface of the rotating member 72, and since the bearings 75 are installed between the coupling bush 74 and the rotating member 72 and between the rotating member 72 and the fixing member 71, the rotating member 72 is installed to be restricted in the axial direction, and rotatable relative to the fixing member 71.

Figure 6:
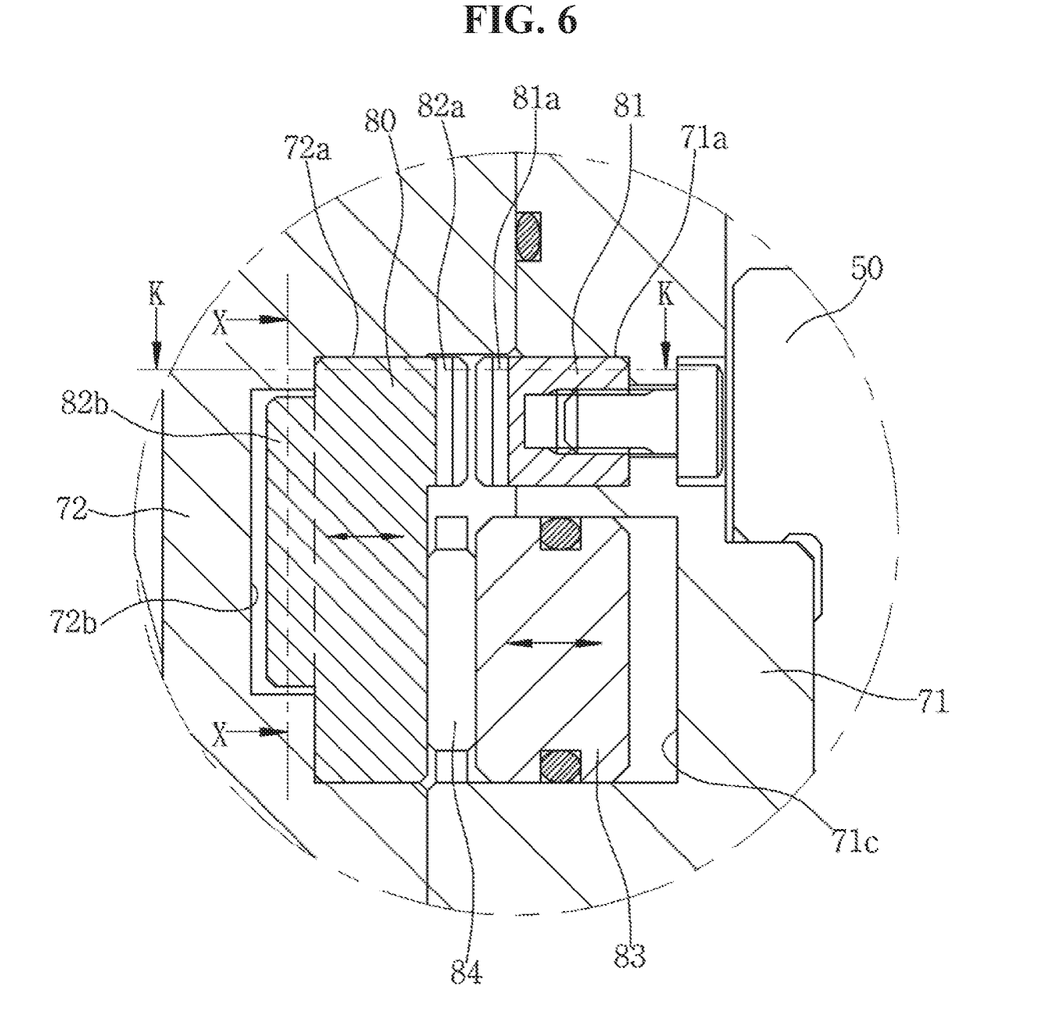
FIG. 6 is an enlarged view of portion A in FIG. 4A.
Figure 7:
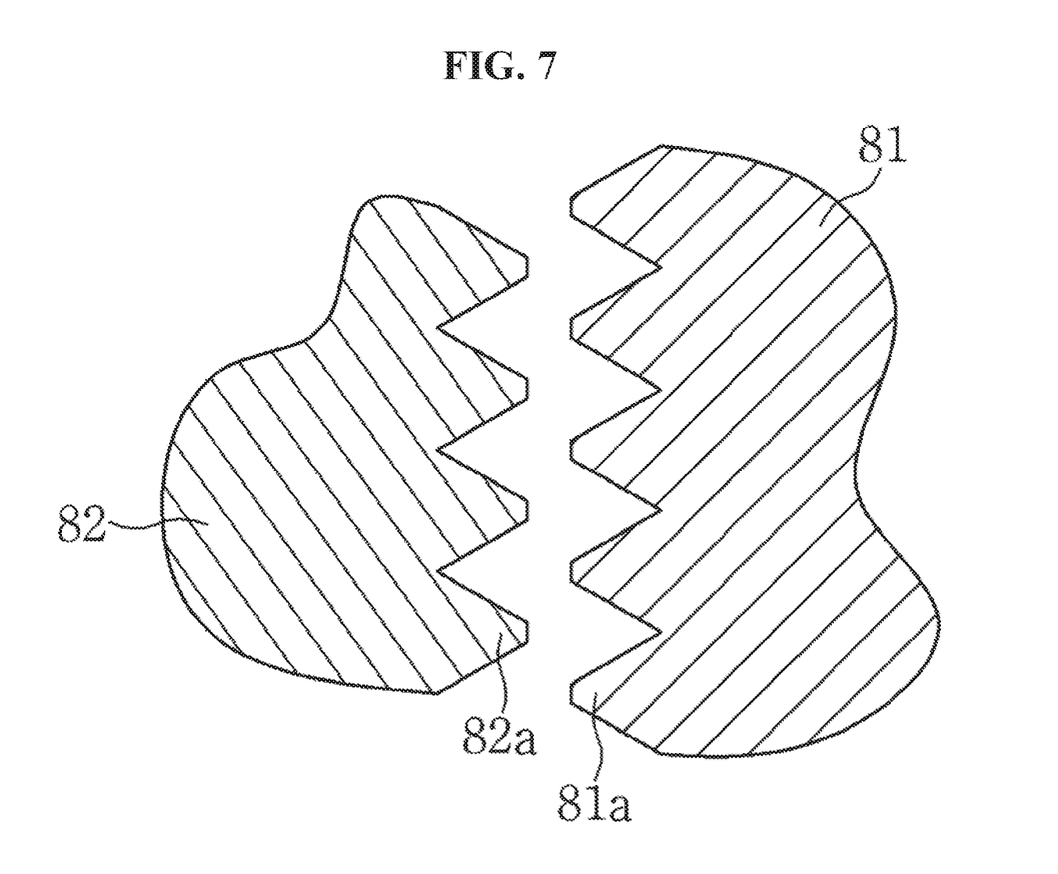
FIG. 7 is a cross-sectional view taken along line K-K in FIG. 6.
Figure 8:
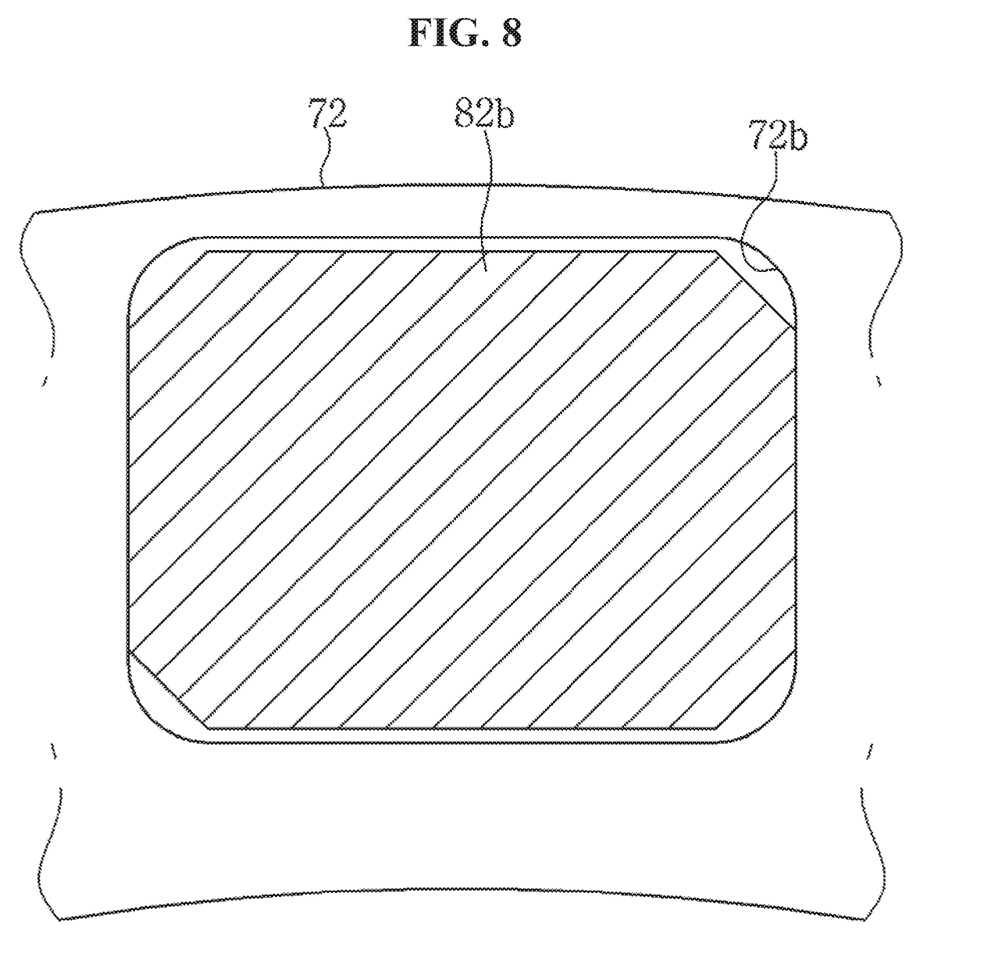
FIG. 8 is a cross-sectional view taken along line X-X in FIG. 6.

The fixed clutch 81 is formed in a ring shape, and is fixedly installed inside a fixed clutch accommodation groove 71a formed in a rear surface of the fixing member 71. The movable clutch 82 is installed in a movable clutch accommodation groove 72a formed in a front surface of the rotating member 72 to be movable in the forward and backward directions but not to be relatively rotatable. To the end, as shown in FIGS. 6 and 8, a plurality of guide blocks 82b each having a polygonal shape such as a quadrangular shape or the like is formed on a rear surface of the movable clutch 82 to protrude rearward, and a quadrangular guide groove 72b into which the guide blocks 82b are inserted is formed in a rear surface of the movable clutch accommodation groove 72a.

The clutch operating member includes a piston 83 installed inside a piston accommodation groove 71c formed in the fixing member 71 and configured to push the movable clutch 82 backward while moving backward due to a pneumatic pressure applied to the inside of the piston accommodation groove 71c, a plurality of clutch springs 85 disposed between the rotating member 72 and the movable clutch 82 to apply an elastic force forward to the movable clutch 82, and a piston bearing 84 disposed between the movable clutch 82 and the piston 83 to rotatably support the movable clutch 82 on the basis of the piston 83. The piston bearing 84 acts to minimize a frictional force between the movable clutch 82 and the piston 83 when the rotating member 72 rotates.

The chuck locking unit includes a fixing pin 61 installed at a front of the housing 10 to linearly reciprocate toward the chuck 50 to fix the chuck 50 to the housing 10, and a pneumatic actuator 62 which allows the fixing pin 61 to linearly reciprocate.

The fixing pin 61 is installed on a support block 65 fixedly installed on the front end of the housing 10 to be able to move forward and backward in a radial direction of chuck 50, and a front end portion of the fixing pin 61 is inserted into a locking groove 71b formed in the fixing member 71 or the outer circumferential surface of the chuck 50 to fix the chuck 50 to the housing 10.

The pneumatic actuator 62 is provided with a first port 62a formed to be fixed to the support block 65, and to which a pneumatic pressure for moving the fixing pin 61 radially inward is applied, and a second port 62b to which a pneumatic pressure for moving the fixing pin 61 radially outward is applied.

Meanwhile. a pneumatic flow path (not shown) extending from the piston accommodation groove 71c to the locking groove 71b is formed in the fixing member 71, air supply flow paths 62c and 61a which communicate with the pneumatic flow path (not shown) when the fixing pin 61 is inserted into the locking groove 71b are formed in the pneumatic actuator 62 and the fixing pin 61, and an end portion of the air supply flow path 62c formed in the pneumatic actuator 62 is connected to an external air supply means (not shown) to operate the piston 83 by supplying air to the pneumatic flow path (not shown). The air supply flow path 61a of the fixing pin 61 communicates with the air supply flow path 62c of the pneumatic actuator 62 when the fixing pin 61 moves radially inward and is inserted into the locking groove 71b of the fixing member 71, and deviates from the air supply flow path 62c of the pneumatic actuator 62 and thus air supply is stopped when the fixing pin 61 moves radially outward and is separated to an outer side of the locking groove 71b of the fixing member 71.

Further, a lubricating oil flow path 71d is formed in the fixing member 71 to communicate with the locking groove 71b, a lubricating oil supply flow path 61b which communicates with the lubricating oil flow path 71d when the fixing pin 61 is inserted into the locking groove 71b is formed in the fixing pin 61, and the lubricating oil supply flow path 61b is connected to an external lubricating oil supply means to supply lubricating oil to a component which and requires lubrication through the lubricating oil flow path 71d, for example, the bearing 75, the movable clutch 82, or the like.

Referring to FIGS. 1 to 3, FIG. 9, and FIG. 10, the driving unit includes a ring-shaped driving member 92 fixed to an outer surface of the rear portion of the spindle 20, a plurality of driving pins 93 formed in the driving member 92 to protrude radially inward, and a driving carrier 94 installed between the driving member 92 and the female screw cover 95.

Figure 9:
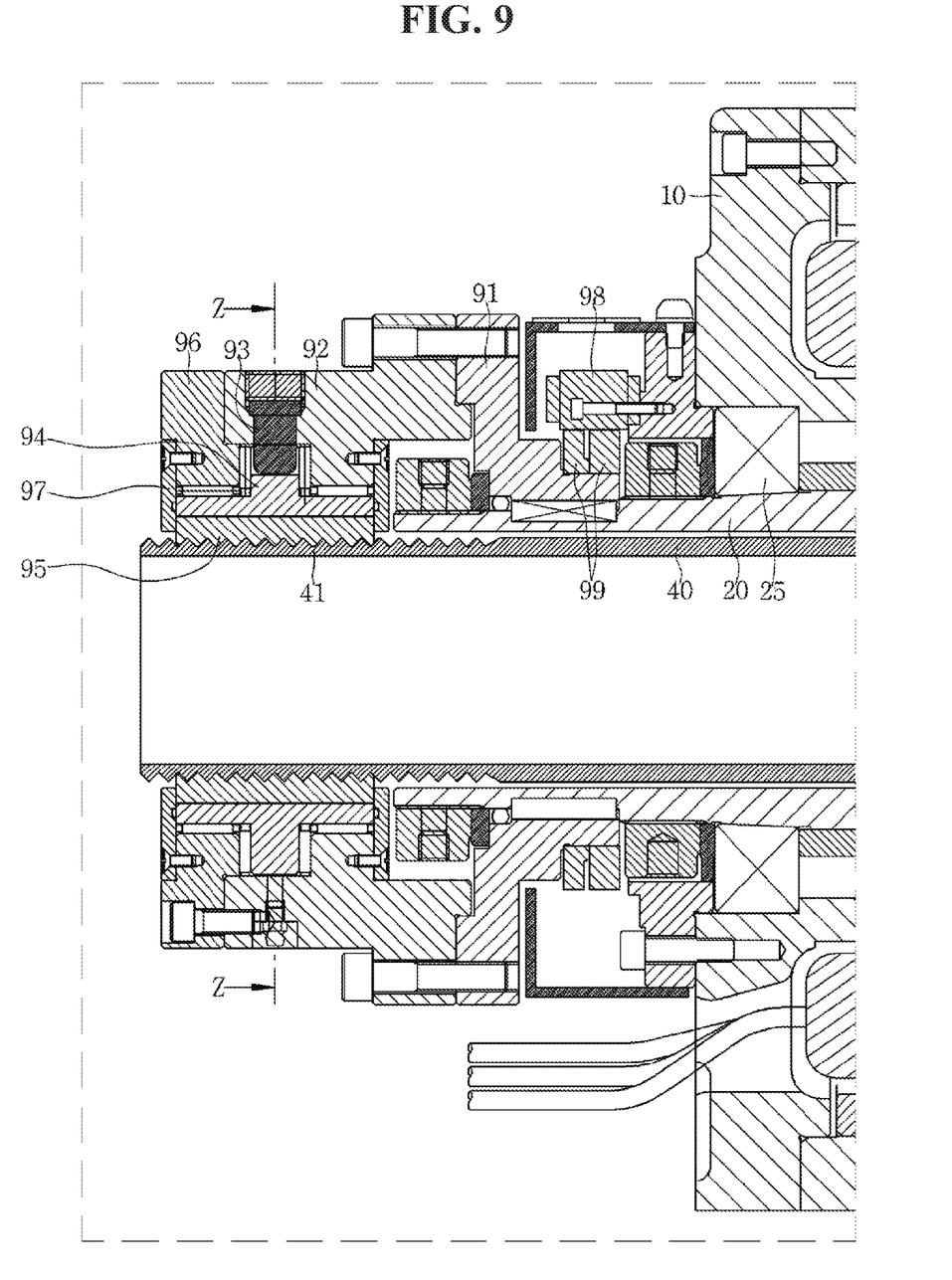
FIG. 9 is an enlarged cross-sectional view illustrating another portion of the electric driving system shown in FIG. 1.

The driving member 92 is installed to be fixed to a driving adaptor 91 having an inner circumferential surface coupled to the rear portion of the spindle 20 so as not to be rotatable and linearly movable on the basis of the spindle 20, by a fastening means such as a bolt, to rotate with the spindle 20 and the driving adaptor 91.

Figure 10:
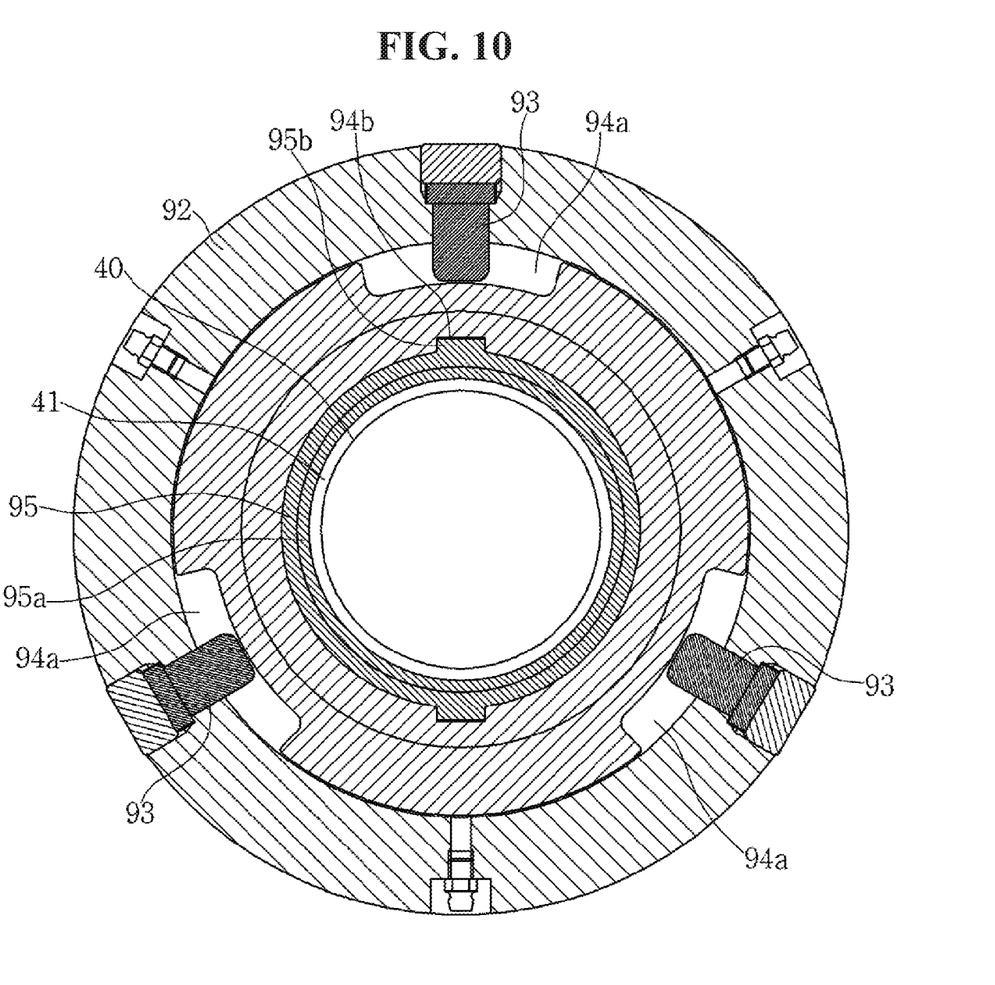
FIG. 10 is a cross-sectional view taken along line Z-Z in FIG. 9.

A backlash groove 94a into which a front end portion of the driving pin 93 is inserted is formed in an outer circumferential surface of the driving carrier 94, and an outer circumferential surface of the female screw cover 95 is coupled to an inner circumferential surface of the driving carrier 94 to rotate the female screw cover 95. The backlash groove 94a is formed in a long hole shape extending in a circumferential direction of the spindle 20, and is formed with a space, which allows relative movement of driving pin 93, between the driving pin 93 and both end portions of the backlash groove 94a. Further, a cover key groove 94b and a cover key 95b which connect the female screw cover 95 to the driving carrier 94 to be slidable in forward and backward directions and restrict relative rotation in a circumferential direction are provided between the inner circumferential surface of the driving carrier 94 and the outer circumferential surface of the female screw cover 95 so that the female screw cover 95 may be easily separated from the driving carrier 94.

Further, a cover unit formed of a ring-shaped fixed cover 96 and a separable cover 97 are detachably installed on a rear end portion of the driving member 92 by a fastening means such as a bolt. Accordingly, when the size or type of the workpiece is changed and thus the drawbar 40 and/or the female screw cover 95 has to be replaced, a replacing process may be performed by separating the separable cover 97 from the fixed cover 96, and separating the female screw cover 95 from the driving carrier 94.

The female screw cover 95 is coupled to the driving carrier 94 in a spline structure to rotate with the driving carrier 94. A thread 95a screw-coupled to the lead screw 41 formed on the rear end of the drawbar 40 is formed on an inner circumferential surface of the female screw cover 95. Accordingly, when the female screw cover 95 rotates, the lead screw 41 and the drawbar 40 linearly move in the forward and backward directions due to an interaction between the thread 95a of the female screw cover 95 and the lead screw 41.

The encoder unit includes a slot plate 99 fixed to the driving adaptor 91 to rotate with the driving adaptor 91, and an encoder sensor 98 fixed to a rear end portion of the housing 10. Since the slot plate 99 is formed with an irregularity with a uniform angle on an outer circumferential surface thereof, the encoder sensor 98 detects an angle of the irregularity of the outer circumferential surface of the slot plate 99 to detect the rotating position of the spindle 20.

A method of operating the above-described built-in type electric driving system consists of the following operations.

(S1) operating the chuck locking unit to fix the chuck 50 to the housing 10

(S2) operating the clutch unit to separate the spindle 20 from the chuck 50 so that the spindle 20 is rotatable relative to the chuck 50

(S3) applying power to the built-in motor to rotate the spindle 20 by a predetermined amount in one direction (S4) rotating the female screw cover 95 through rotation of the driving unit coupled to the spindle 20 to move the lead screw 41 and the drawbar 40 backward or forward by a predetermined distance, and clamp the workpiece (S5) operating the clutch unit in a manner opposite the operation S2 to restrict the spindle 20 to the chuck 50

(S6) operating the chuck locking unit in a manner opposite the operation 51 to release a fixed state of the chuck 50

(S7) applying power to the built-in motor to process the workpiece while rotating the spindle 20 at a predetermined rotational speed in one direction Hereinafter, the above-described operating method will be described in more detail.

In order to process the workpiece, the jaw 51 of the machine tool should firmly clamp the workpiece. In a clamping mode for the clamping operation, as shown in FIG. 4A, since the pneumatic pressure is applied through the first port 62a of the pneumatic actuator 62 of the chuck locking unit, the fixing pin 61 moves inward in the radial direction of the chuck 50, and the chuck 50 is fixed to the housing 10 while the front end portion of the fixing pin 61 is inserted into the locking groove 71b of the fixing member 71 (operation S1).

In this state, air is supplied through the air supply flow paths 62c and 61a of the pneumatic actuator 62 and the fixing pin 61, and thus the piston 83 of the clutch unit moves backward. Accordingly, since the movable clutch 82 moves backward, the first serration 81a of the fixed clutch 81 and the second serration 82a of the movable clutch 82 are separated and thus a restricted state between the rotating member 72 and the fixing member 71 is released and the rotating member 72 becomes rotatable on the basis of the fixing member 71 (operation S2).

Subsequently, when the power is applied to the built-in motor and thus the rotor 32 and the spindle 20 rotate by a predetermined amount (operation S3), the driving adaptor 91, the driving member 92, the driving pin 93, the driving carrier 94, and the female screw cover 95 coupled to the rear of the spindle 20 also rotate. In this case, the driving pin 93 transfers the rotational force to the driving carrier 94 in one direction by colliding with one end portion of the backlash groove 94a.

As the female screw cover 95 rotates in a state in which the drawbar 40 is restrained from rotating relative to the chuck 50 by the drawbar key groove 42 and the drawbar key 43, thrust is generated in the rear (or in the front) of the lead screw 41, and thus the drawbar 40 is moves backward (or forward) by a predetermined distance (operation S4). Accordingly, the jaw 51 connected to the drawbar 40 is clamped radially inward to clamp the workpiece. In this case, since the lead screw 41 at the rear end of the drawbar 40 is spirally coupled to the female screw cover 95 and thus tightly fastened, a clamping force may be maintained by a self-locking action of the lead screw 41 even when the built-in motor does not operate.

Subsequently, the built-in motor reversely operates and thus the spindle 20, the driving member 92, and the driving pin 93 rotate by a predetermined amount in a direction opposite the previous case so that a position signal is received from the encoder sensor 98 and thus teeth of the first serration 81a of the fixed clutch 81 and the second serration 82a of the movable clutch 82 are accurately engaged. In this case, since idling of the driving pin 93 by a certain distance from an inner side of the backlash groove 94a of the driving carrier 94 may be performed, the driving carrier 94 is not rotated by the driving pin 93, and the chuck adaptor 73 and the rotating member 72 rotate on the basis of the fixing member 71 to adjust a position of the movable clutch 82. When the second serration 82a of the movable clutch 82 is not accurately engaged with the first serration 81a of the fixed clutch 81, although the rotational force is not accurately transferred to the chuck 50 in the case in which the workpiece is processed by high speed rotation of the spindle 20 and thus poor processing may occur, in the present invention, since the backlash groove 94a having a width greater than a diameter of the driving pin 93 is formed in the driving carrier 94, the rotating member 72 may be rotated by a predetermined amount without rotating the driving carrier 94, and thus the position of the movable clutch 82 may be adjusted.

As described above, when the position of the movable clutch 82 is adjusted, application of the pneumatic pressure through the air supply flow paths 62c and 61a of the pneumatic actuator 62 and the fixing pin 61 is stopped and thus an external force applied to a rear of the piston 83 of the clutch unit is removed. Accordingly, as shown in FIG. 4B, since the movable clutch 82 and the piston 83 proceed due to an elastic force of the clutch spring 85 and thus the second serration 82*a* of the movable clutch 82 is engaged with the first serration 81*a* of the fixed clutch 81, the rotating member 72 and the fixing member 71 are restricted by each other (operation S5).

Subsequently, since the pneumatic pressure is applied through the second port 62*b* of the pneumatic actuator 62 and thus the fixing pin 61 moves radially outward, fixed states of the fixing member 71 and the chuck 50 are released (operation S6).

In this state, when the power is applied to built-in motor to rotate the spindle 20 at high speed, since the driving adaptor 91, the driving member 92, the driving carrier 94, and the female screw cover 95 rotate with the spindle 20, and the rotating member 72, the fixing member 71, the chuck 50, and the drawbar 40 at the front of the spindle 20 also rotate, the workpiece is processed (operation S7).

When processing of the workpiece is completed, the spindle 20 stops, and the position signal is received from the encoder sensor 98 so that the position of the fixing member 71 is adjusted by rotating the spindle 20 to an initial position where the fixing pin 61 of the chuck locking unit may be inserted into the locking groove 71*b* of the fixing member 71. Subsequently, the fixing member 71 and the chuck 50 are fixed by applying the pneumatic pressure through the first port 62*a* of the pneumatic actuator 62 to move the fixing pin 61 radially inward, and the jaw 51 spreads to release the workpiece by rotating the spindle 20 in a direction opposite the direction in the clamping driving mode to rotate the female screw cover 95 and move the drawbar 40 forward (or backward).

In this case, since the fixing pin 61 applies an impact to rotate the driving carrier 94 by colliding with another side end portion of the backlash groove 94*a* of the driving carrier 94, self-locking of the lead screw 41 may be easily released.

Meanwhile, in the case of the clutch unit configured in the electric driving system, in order to accurately engage the serrated serrations 81*a* and 82*a* respectively formed in the fixed clutch 81 and the movable clutch 82 when changed from the clamping driving mode to the rotation driving mode, the rotating member 72 may be rotated in a reverse clamping direction or further rotated in a forward clamping direction for engagement. A situation in which a clamping force is reduced may occur in rotation in the reverse clamping direction, but more rotation in the forward clamping direction (the serrations are engaged within an angle of roughly 0.5° to 2° by further increasing the number of serrations) is possible due to an increase of the clamping force. However, in the case of the electric driving system, the clamping force is accurately controlled, and the initially set clamping force should not be changed by reverse or forward rotation of the driving member and the rotating member 72. To this end, in the present invention, since a backlash structure is formed in the driving unit, that is, since the backlash groove 94*a* is formed in the driving carrier 94 constituting the driving unit, and the driving pin 93 inserted into the backlash groove 94*a* to transfer the rotating force is formed in the driving member 92 that rotates by receiving a driving force from the built-in motor, a change of the clamping force when an adjustment operation of the engagement of the serrations of the clutch unit is performed may be prevented.

In the above, although the present invention has been described in detail with reference to the embodiments, various substitutions, addition, and modifications may be performed by those skilled in the art within the above-described technical spirit, and the modifications should be interpreted as being included in the scope of the present invention determined by the appended claims which will be described below.

The present invention can be applied to a machine tool, which processes a workpiece, such as a lathe or the like.

The invention claimed is:

1. A built-in type electric driving system of a machine tool, comprising:
   a housing;
   a hollow tube-shaped spindle extending from the housing in forward and backward directions and rotatably installed on the basis of the housing;
   a built-in motor consisting of a stator fixed to the inside of the housing and a rotor fixed to an outer surface of the spindle, and configured to generate torque between the stator and the rotor by power applied from the outside to cause rotation of the rotor;
   a chuck installed at a front end of the spindle and including a jaw configured to grip a workpiece;
   a drawbar installed at an inner side of the spindle to be linearly movable in the forward and backward directions, and having a front end connected to the jaw;
   a drawbar key and a drawbar key groove configured to connect the drawbar to the chuck so that the drawbar is linearly movable, but not rotatable;
   a chuck locking unit configured to restrict or release the rotational movement of the chuck on the basis of the housing;
   a clutch unit installed to be movable in the forward and backward directions between a front portion of the spindle and a rear portion of the chuck to restrict the spindle relative to the chuck or separate the spindle so that the spindle is rotatable relative to the chuck;
   a lead screw formed with a thread in a spiral shape on an outer surface thereof, and formed to be fixed to the drawbar;
   a driving unit fixed to the outer surface of the spindle to rotate together with the spindle; and
   a female screw cover coupled to the driving unit to rotate together with the driving unit, and having a thread formed on an inner circumferential surface thereof to be screw-coupled to the thread of the lead screw.

2. The built-in type electric driving system of claim 1, wherein the clutch unit includes a fixing member fixed to a rear surface of the chuck, a rotating member fixed to the front end of the spindle, and rotatably connected to the fixing member, a fixed clutch fixed to a rear of the fixing member and formed with a serrated first serration along a circumferential direction, a movable clutch installed at a front of the rotating member to be movable in forward and backward directions and having a serrated second serration, formed along the circumferential direction, which is engaged with the first serration and restricts rotation of the rotating member relative to the fixing member, and a clutch operating member which moves the movable clutch backward.

3. The built-in type electric driving system of claim 2, wherein the clutch operating member includes a piston installed inside a piston accommodation groove formed in the fixing member and configured to push the movable clutch backward while moving backward due to a pneumatic pressure applied to the inside of the piston accommodation groove, a clutch spring configured to apply a forward elastic force to the movable clutch, and a piston bearing disposed between the movable clutch and the piston to rotatably support the movable clutch on the basis of the piston.

4. The built-in type electric driving system of claim 3, wherein the chuck locking unit includes a fixing pin installed at a front of the housing to linearly reciprocate toward the chuck, and having a front end portion inserted into a locking groove formed in the fixing member or an outer circumferential surface of the chuck, and a pneumatic actuator which allows the fixing pin to linearly reciprocate.

5. The built-in type electric driving system of claim 4, wherein:
- a pneumatic flow path extending from the piston accommodation groove to the locking groove is formed in the fixing member;
- an air supply flow path configured to communicate with the pneumatic flow path when the fixing pin is inserted into the locking groove is formed in the fixing pin; and
- the air supply flow path is connected to an external air supply means to supply air to the pneumatic flow path.

6. The built-in type electric driving system of claim 4, wherein:
- a lubricating oil flow path is formed in the fixing member to communicate with the locking groove;
- a lubricating oil supply flow path configured to communicate with the lubricating oil flow path when the fixing pin is inserted into the locking groove is formed in the fixing pin; and
- the lubricating oil supply flow path is connected to an external lubricating oil supply means to supply lubricating oil to the lubricating oil flow path.

7. The built-in type electric driving system of claim 1, wherein the driving unit includes a ring-shaped driving member fixed to the outer surface of the spindle, a driving pin formed in the driving member to protrude radially inward, and a driving carrier installed between the driving member and the female screw cover, and having an outer circumferential surface formed with a backlash groove into which a front end portion of the driving pin is inserted and an inner circumferential surface coupled to an outer circumferential surface of the female screw cover to rotate together with the female screw cover.

8. The built-in type electric driving system of claim 7, wherein the backlash groove is formed in a long hole shape extending in a circumferential direction of the spindle, and is formed with a space, which allows relative movement of driving pin, between the driving pin and both end portions of the backlash groove.

9. The built-in type electric driving system of claim 7, wherein a cover key groove and a cover key which connect the female screw cover to the driving carrier to be slidable in forward and backward directions and restrict not to relatively rotate in a circumferential direction are provided between the inner circumferential surface of the driving carrier and the outer circumferential surface of the female screw cover.

10. The built-in type electric driving system of claim 9, wherein the driving unit further includes a cover unit detachably installed on a rear end portion of the driving member to perform a replacing process after separating the cover unit from the driving member when replacing the drawbar or the female screw cover.

11. The built-in type electric driving system of claim 1, further comprising an encoder unit configured to detect a rotating amount and a rotating position of the spindle.

12. A method of operating working the built-in type electric driving system of claim 1:
- (S1) operating a chuck locking unit to fix a chuck to a housing;
- (S2) operating a clutch unit to separate a spindle from the chuck so that the spindle is rotatable relative to the chuck;
- (S3) applying power to a built-in motor to rotate the spindle by a predetermined amount in one direction;
- (S4) rotating a female screw cover through rotation of a driving unit coupled to the spindle to move a lead screw and a drawbar backward by a predetermined distance and clamp a workpiece;
- (S5) operating the clutch unit in a manner opposite the operation (S2) to restrict the spindle to the chuck;
- (S6) operating the chuck locking unit in a manner opposite the operation (S1) to release a fixed state of the chuck; and
- (S7) applying power to the built-in motor to process the workpiece while rotating the spindle at a predetermined rotational speed in the one direction.

13. The method of claim 12, wherein rotating the spindle by a predetermined angle to adjust a position of a movable clutch of the clutch unit so that the built-in motor operates in a direction opposite the direction in the operation (S3) by receiving a position signal from an encoder unit between the operations (S4) and (S5) and thus teeth of a first serration formed in a fixed clutch of the clutch unit and a second serration formed in the movable clutch are accurately engaged is performed.

* * * * *